United States Patent
Moeller et al.

(10) Patent No.: US 10,939,627 B2
(45) Date of Patent: Mar. 9, 2021

(54) SYSTEM AND METHOD FOR CASCADING ALIGNMENT OF INDEPENDENT DRIVE SYSTEMS

(71) Applicant: Valmont Industries, Inc., Omaha, NE (US)

(72) Inventors: Mark Moeller, Valley, NE (US); Tracy A. Thatcher, Gretna, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 16/586,155

(22) Filed: Sep. 27, 2019

(65) Prior Publication Data

US 2020/0113144 A1    Apr. 16, 2020

Related U.S. Application Data

(60) Provisional application No. 62/744,388, filed on Oct. 11, 2018.

(51) Int. Cl.
*A01G 25/16* (2006.01)
*A01G 25/09* (2006.01)
*B05B 3/18* (2006.01)

(52) U.S. Cl.
CPC ......... *A01G 25/165* (2013.01); *A01G 25/092* (2013.01); *B05B 3/18* (2013.01)

(58) Field of Classification Search
CPC ...... A01G 25/09; A01G 25/092; A01G 25/16; A01G 25/165; A01G 27/003; B05B 3/18

(Continued)

(56) References Cited

U.S. PATENT DOCUMENTS

| 2003/0066912 A1 | 4/2003 | Krieger et al. |
| 2007/0267524 A1 * | 11/2007 | Mack ................... A01G 25/092 239/729 |

(Continued)

FOREIGN PATENT DOCUMENTS

EP    1192855 A2    4/2002

OTHER PUBLICATIONS

Irrigation.Education Community, "How a Center Pivot Irrigation Machine Works", Jan. 4, 2016 (Jan. 4, 2016), 7 pages, Retrieved on Mar. 25, 2020 from <http://blog.irrigation.education/blog/how-a-center-pivot-works>.

*Primary Examiner* — Young T. Tse
(74) *Attorney, Agent, or Firm* — Milligan PC LLO (57) ABSTRACT

The present invention provides a system for aligning drive towers within an irrigation system. According to a preferred embodiment, the present invention includes a system and method for cascading alignment of independent drive systems. According to a preferred embodiment, a preferred method may include the steps of: transmitting controller timing data to the first intermediate drive tower and the second intermediate drive tower; assigning a first correction time slot to the second intermediate drive tower; assigning a second correction time slot to the first intermediate drive tower; receiving first alignment data by the second intermediate drive tower; receiving second alignment data by the first intermediate drive tower; performing a first alignment correction based on the first alignment data received by the second intermediate drive tower; and performing a second alignment correction based on the second alignment data received by the first intermediate drive tower.

23 Claims, 6 Drawing Sheets

(58) Field of Classification Search
USPC ........ 375/219, 220, 257, 259; 239/723, 728, 239/731, 733; 455/40
See application file for complete search history.

(56) References Cited

U.S. PATENT DOCUMENTS

| | | |
|---|---|---|
| 2012/0305682 A1 | 12/2012 | Korus |
| 2013/0048747 A1 | 2/2013 | Pfrenger et al. |
| 2013/0253752 A1 | 9/2013 | Grabow |
| 2016/0309667 A1* | 10/2016 | Kreikemeier .......... A01G 25/09 |
| 2017/0295730 A1* | 10/2017 | Abts .................... A01G 25/092 |
| 2017/0349060 A1* | 12/2017 | Abts ...................... B60L 15/20 |
| 2018/0348714 A1* | 12/2018 | Larue ................. G05B 13/0265 |
| 2019/0021245 A1* | 1/2019 | Thatcher ................ A01G 25/09 |
| 2019/0037786 A1* | 2/2019 | Fischman ............ A01G 25/092 |
| 2019/0235091 A1* | 8/2019 | Thatcher ............. A01G 25/092 |
| 2020/0127492 A1* | 4/2020 | Moeller ................ A01G 25/16 |

* cited by examiner

SYSTEM AND METHOD FOR CASCADING ALIGNMENT OF INDEPENDENT DRIVE SYSTEMS

RELATED APPLICATIONS

The present application claims priority to U.S. Provisional Application No. 62/744,388, filed Oct. 11, 2018, which is hereby incorporated by reference herein.

BACKGROUND AND FIELD OF THE PRESENT INVENTION

Field of the Present Invention

The present invention relates generally to a system and method for alignment control of irrigation spans and, more particularly, to a system and method for cascading alignment of independent drive systems.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. In these modern irrigation systems, a significant number of powered elements are used to control various aspects of irrigation. These often include remote, independent power for a variety of sensors, sprayers, drive control systems, motors and transducers.

In operation, control and powering of each of these powered elements is accomplished via systems of electromechanical devices including relays, switches and other devices with moving parts. Given their size and complexity, modern irrigation machines are prone to repeated mechanical and electrical breakdowns. One important source of mechanical breakdowns is misalignment of drive towers. With the large spacing between each drive tower of an irrigation span, significant stress and shearing force can be created with even a minimal amount misalignment. The primary method of controlling alignment in conventional irrigation systems relies upon electromagnetic switches which are used to control the operations of individual drive motors. These systems have large response times and lack the ability to fine-tune alignment changes. Further, these types of systems rely on mechanical linkages between individual spans. As such they are susceptible to changes in span orientation (span roll) due to wind, terrain or the like. Further, these systems require that each alignment be performed as a lengthy sequence of interactions between drive towers. These systems of the prior art are cumbersome, prone to communication errors and often allow high structural stresses to develop discussed above.

A further alternative method for alignment control relies upon individual GPS receivers which inform each individual drive tower regarding location and alignment. These systems are prone to slow response times due to the transmission lags. Further, GPS based systems without some type of correction (such as RTK, WAAS, D-GPS, or the like) all suffer from a significant margin of error which is generally too large to be useful when fine tuning the alignment of irrigation spans.

To overcome the limitations of the prior art, a reliable and effective system is needed to control and align irrigation spans and drive towers.

SUMMARY OF THE PRESENT INVENTION

To address the shortcomings presented in the prior art, the present invention provides a system for providing power and alignment control within an irrigation system having at least two spans and a drive system for moving the spans. According to a first preferred embodiment, the present invention includes a method for maintaining the alignment of an irrigation system having a plurality of connected spans and a plurality of drive towers for moving the connected span around a center pivot having a pivot controller. Alternatively, a linear cart could be substituted for the center pivot.

According to a preferred embodiment, the present invention relates to a system and method for cascading alignment of independent drive systems. According to a preferred embodiment, the method for alignment control of irrigation spans includes the steps of: transmitting controller timing data to the first intermediate drive tower and the second intermediate drive tower; assigning a first correction time slot to the second intermediate drive tower; assigning a second correction time slot to the first intermediate drive tower; receiving first alignment data by the second intermediate drive tower; receiving second alignment data by the first intermediate drive tower; performing a first alignment correction based on the first alignment data received by the second intermediate drive tower; and performing a second alignment correction based on the second alignment data received by the first intermediate drive tower.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including: a motor, a controller, a communication device (such as a PLC or the like) and an alignment device. While the present invention is discussed specifically with respect to a PLC system, any other type of communication system may be used. Further, while the invention is discussed below with respect to four exemplary towers, the number of towers used may be expanded or reduced (i.e. 2-100 towers) as needed without departing from the spirit of the present invention. Further, the term "motor" as used herein may refer to any suitable motor for providing torque to a drive wheel. Accordingly, the term "motor" as used herein may preferably include motors such switch reluctance motors, induction motors and the like.

The terms "program," "computer program," "software application," "module," firmware" and the like as used herein, are defined as a sequence of instructions designed for execution on a computer system. The term "solid state" should be understood to refer to a range of solid state electronic devices which preferably include circuits or devices built from solid materials and in which the electrons, or other charge carriers, are confined entirely within the solid material. Exemplary solid-state components/materials may include crystalline, polycrystalline and amorphous solids, electrical conductors and semiconductors. Common solid-state devices may include transistors, microprocessor chips, and RAM.

A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOS-FET) technologies like complementary metal-oxide semiconductor (CMOS), bipolar technologies like emitter-coupled logic (ECL), polymer technologies (e.g., silicon-conjugated polymer and metal-conjugated polymer-metal structure), bidirectional triode thyristors (TRIAC), mixed analog and digital, and the like.

Figure 1:
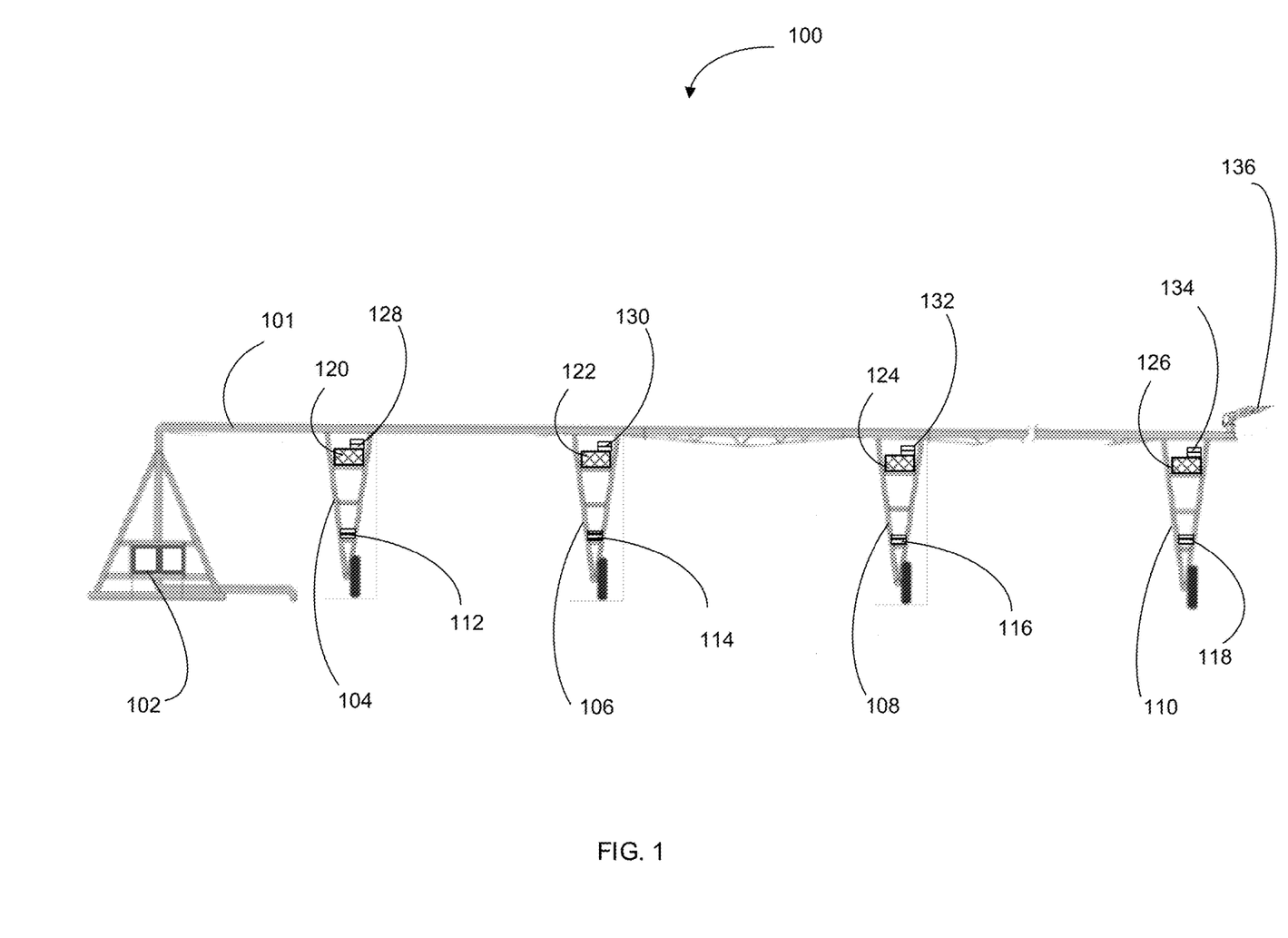
FIG. 1 shows an exemplary irrigation system for use with the present invention.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; stationary systems; corner systems) may be used with the present invention without limitation.

As shown in FIG. 1, the exemplary system 100 shown includes a span 101 which preferably includes a series of connected span sections which may be pressurized to facilitate the transfer of water from a water source through the irrigation system 100. The fluid source may be coupled to a repository or other source of agricultural products to inject fertilizers, pesticides, and/or other chemicals into the fluids to create an applicant for application during irrigation. Thus, the applicant may include water, fertilizers, herbicides, pesticides and any combinations thereof. The exemplary system 100 may further include a main control panel 102 which may control transducers, sensors and valves (not shown) to control and regulate water pressure to sprinklers (not shown) including an end gun 136 and other sprinkler heads (not shown).

As further shown, the system may include drive towers 104, 106, 108, 110 having respective tower control boxes 120, 122, 124, 126. As further shown, these tower control boxes may be interfaced with respective alignment sensors 128, 130, 132, 134 and control respective drive unit motors 112, 114, 116, 118. As discussed above, the system of the present invention may include any motor suitable for providing torque to a drive wheel. According to a preferred embodiment, the system of the present invention may preferably include motors such switch reluctance motors, induction motors and the like.

Figure 2:
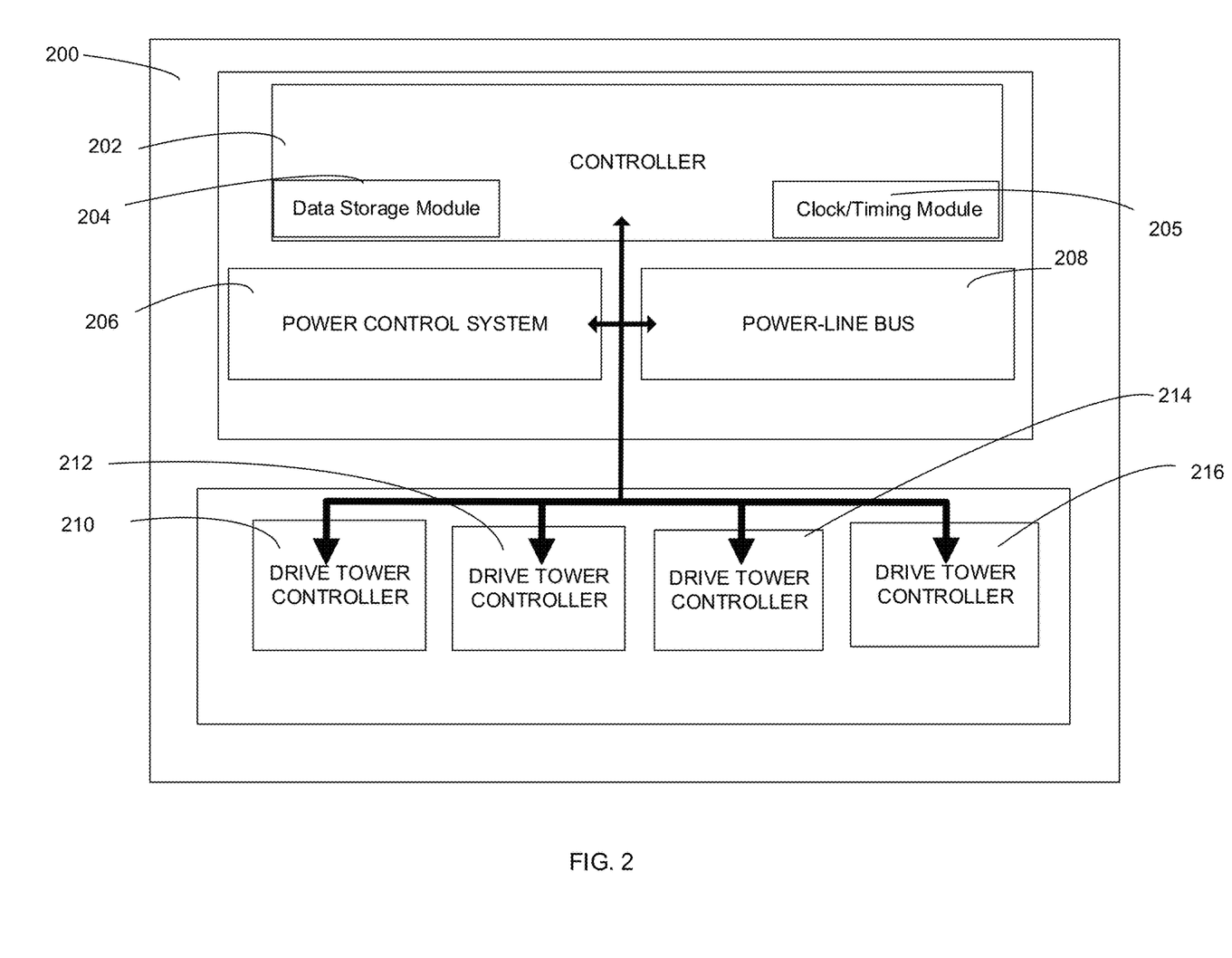
FIG. 2 shows a block diagram illustrating the exemplary processing architecture of a control device in according with a first preferred embodiment of the present invention.

With reference now to FIG. 2, an exemplary control device 200 which represents functionality to control one or more operational aspects of the irrigation system 100 will now be discussed. As shown, the exemplary control device 200 may preferably include a controller 202 which may include a data storage module 204 and an internal clock/timing module 205. The controller 202 preferably provides processing functionality for the control device 200 and may include any number of processors, micro-controllers, or other processing systems. The controller 202 may execute one or more software programs that implement techniques described herein. The memory/data storage module 204 is an example of tangible computer-readable media that provides storage functionality to store various data associated with the operation of the control device 200, such as the software program and code segments mentioned above, or other data to instruct the controller 202 and other elements of the control device 200 to perform the steps described herein. The data storage module 204 may include, for example, removable and non-removable memory elements such as RAM, ROM, Flash (e.g., SD Card, mini-SD card, micro-SD Card), magnetic, optical, USB memory devices, and so forth.

In implementations, exemplary control device 200 preferably further includes a power control system 206 and a power-line BUS 208 which may include conductive transmission lines, circuits and the like for controlling and routing electric power, controlling its quality, and controlling the devices attached to a power-line carrier system as discussed further below.

Although discussed with respect to a power line BUS 208, the system of the present invention may further and/or alternatively communicate with one or more networks through a variety of components such as wireless access points, transceivers and so forth, and any associated software employed by a variety of components (e.g., drivers, configuration software, and so on). As further shown, the control device 200 may be in communication with each drive tower controller 210, 212, 214, 216 to control movement of the irrigation system 100. Further, the control device 200 may preferably further include multiple inputs and outputs to receive data from sensors and other monitoring devices as discussed further below.

Figure 3:
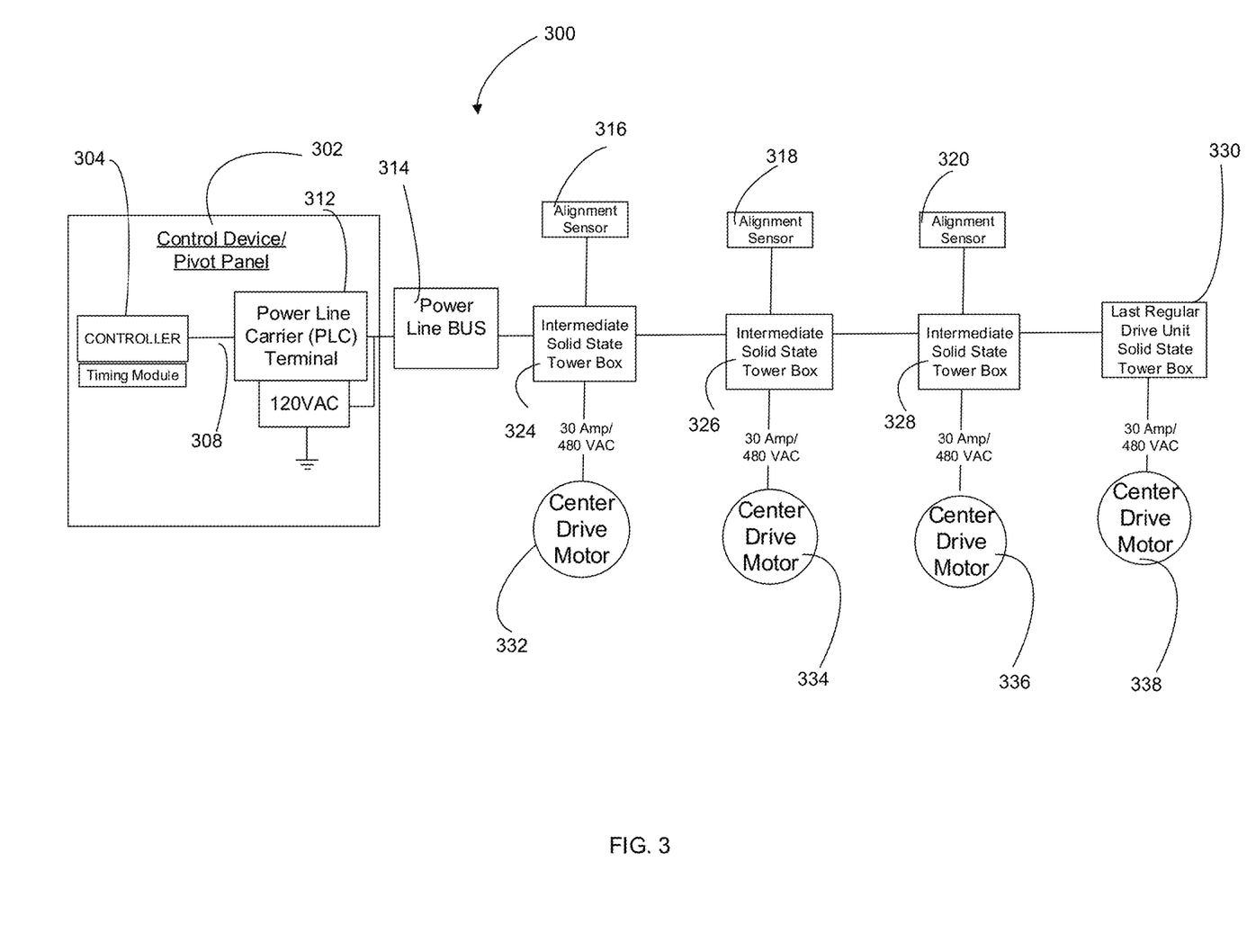
FIG. 3 shows a block diagram of a power and control system in accordance with a further preferred embodiment of the present invention.

With reference now to FIG. 3, further aspects of the present invention shall now be further discussed. As shown in FIG. 3, the power/control system of the present invention 300 may preferably include a control/pivot panel 302 which preferably provides control signals and power to a series of intermediate solid-state tower boxes 324, 326, 328 and a last regular drive unit tower box 330 which control respective drive motors 332, 334, 336, 338. As shown, each solid-state tower box preferably further includes one or more alignment sensors 316, 318, 320. The alignment sensors 316, 318, 320 preferably may be contact or non-contact sensors. Further, additional sensors may further be included such as environmental sensors, GPS sensors, other geolocation sensors and the like without limitation.

It should be understood that solid-state tower boxes are provided as an example and the present invention is not intended to be limited to the use of solid-state tower boxes. For example, electro-mechanical tower boxes may be used in place of the solid-state tower boxes without departing from the scope of the present invention.

As further shown, the control/pivot panel 302 in accordance with a preferred embodiment of the present invention may preferably include a main pivot controller 304 connected to a power-line carrier (PLC) terminal 312 which controls and directs power to downstream intermediate solid-state tower boxes 324, 326, 328 and a last regular drive unit tower box 330. According to a preferred embodiment, the pivot controller 304 is preferably connected to the PLC terminal 312 via a communication connection 308 (i.e. RS-232) or the like. According to a still further preferred embodiment, the pivot panel 302 preferably is connected to and provides power and control signals through the PLC terminal 312 to the downstream solid-state tower boxes 324, 326, 328 via a power-line BUS 314.

Figure 4:
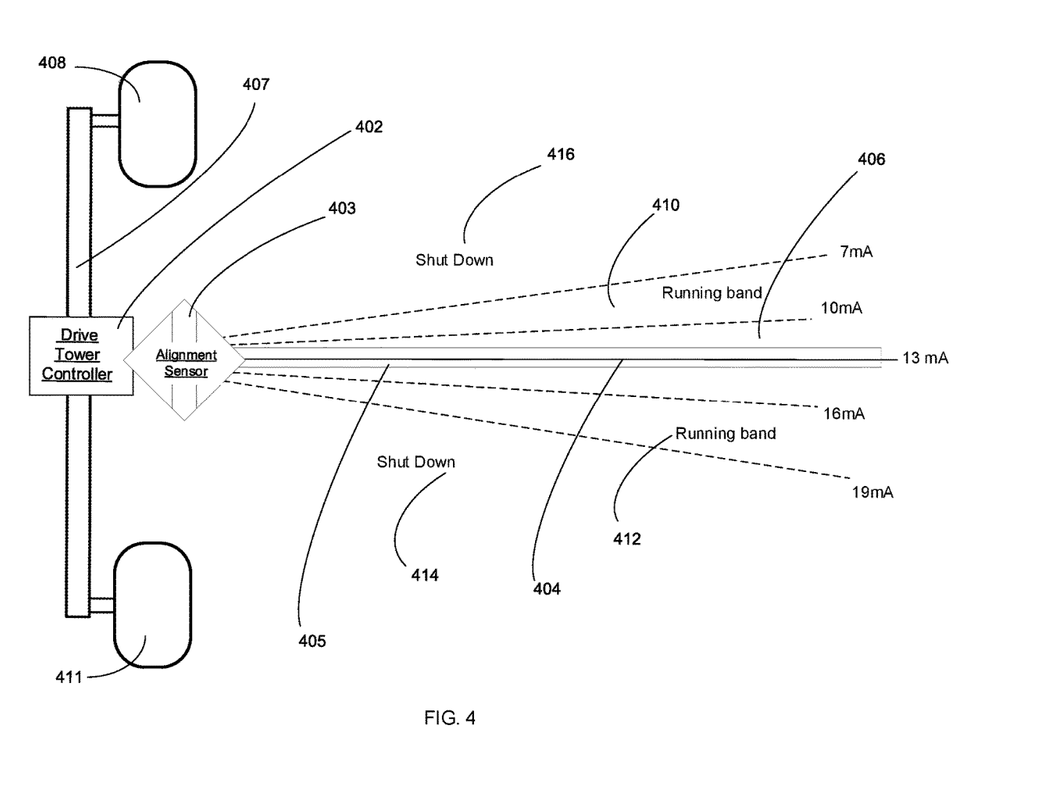
FIG. 4 shows an illustration of an alignment sensor in accordance with a further preferred embodiment of the present invention.

With reference now to FIG. 4, an illustration of an alignment sensor 403 in accordance with a further preferred embodiment of the present invention shall now be discussed. As shown in FIG. 4, the alignment sensor 403 of the present invention is preferably positioned to detect the off-set angle between the span 405 and the drive tower 407. Further, the sensor 403 preferably transmits alignment data to the drive tower controller 402. In operation, the drive tower controller 402 may preferably control the operations of the drive tower 407 and in turn the movement of one or more wheels 408, 411. According to a first preferred embodiment, the drive tower controller 402 may control the operations of the drive tower 407 by changing its drive instructions based on the off-set angle detected by the alignment sensor 403. According to a preferred embodiment, the alignment sensor 403 of the present invention may be a digital or analog sensor. According to a further preferred embodiment, the alignment sensor 403 of the present invention may include sensor ranges which indicate a center point of alignment 404, an optimal band 406, suboptimal bands 410, 412, and safety bands 414, 416. According to preferred embodiments, the optimal band 406 may indicate a range of off-set which is optimal and does not need to be corrected. According to a further preferred embodiment, the sub-optimal bands 410, 412 may represent ranges of off-set which still allow the irrigation machine to safely run, but which must be corrected. Finally, safety bands 414, 416 may preferably represent a range of off-set angles which indicate a safety issue for the irrigation machine and which may trigger a shutdown of the machine.

As further shown in FIG. 4, an exemplary alignment sensor 403 may be a 4-20 milliamp sensor with a center point of alignment 404 at around 13 milliamps. Further, the optimal band 406 may be indicated by a signal in the 10 mA to 16 mA range. The suboptimal bands 410, 412 ("running bands") may be indicated by a signal in the 7-10 mA range or the 16-19 mA range. Finally, the safety bands 414, 416 may be indicated by a signal less than 7 mA or greater than 19 mA. Referring to FIG. 3, based on the received alignment signals from their respective alignment sensors 316, 318, 320, the drive tower controllers within each drive tower box 324, 326, 328 may preferably make continual, independent adjustments to the operating rates of their respective drive motors 332, 334, 336 so that the detected off-set angles are reduced until they are within the optimal band 406.

Figure 5:
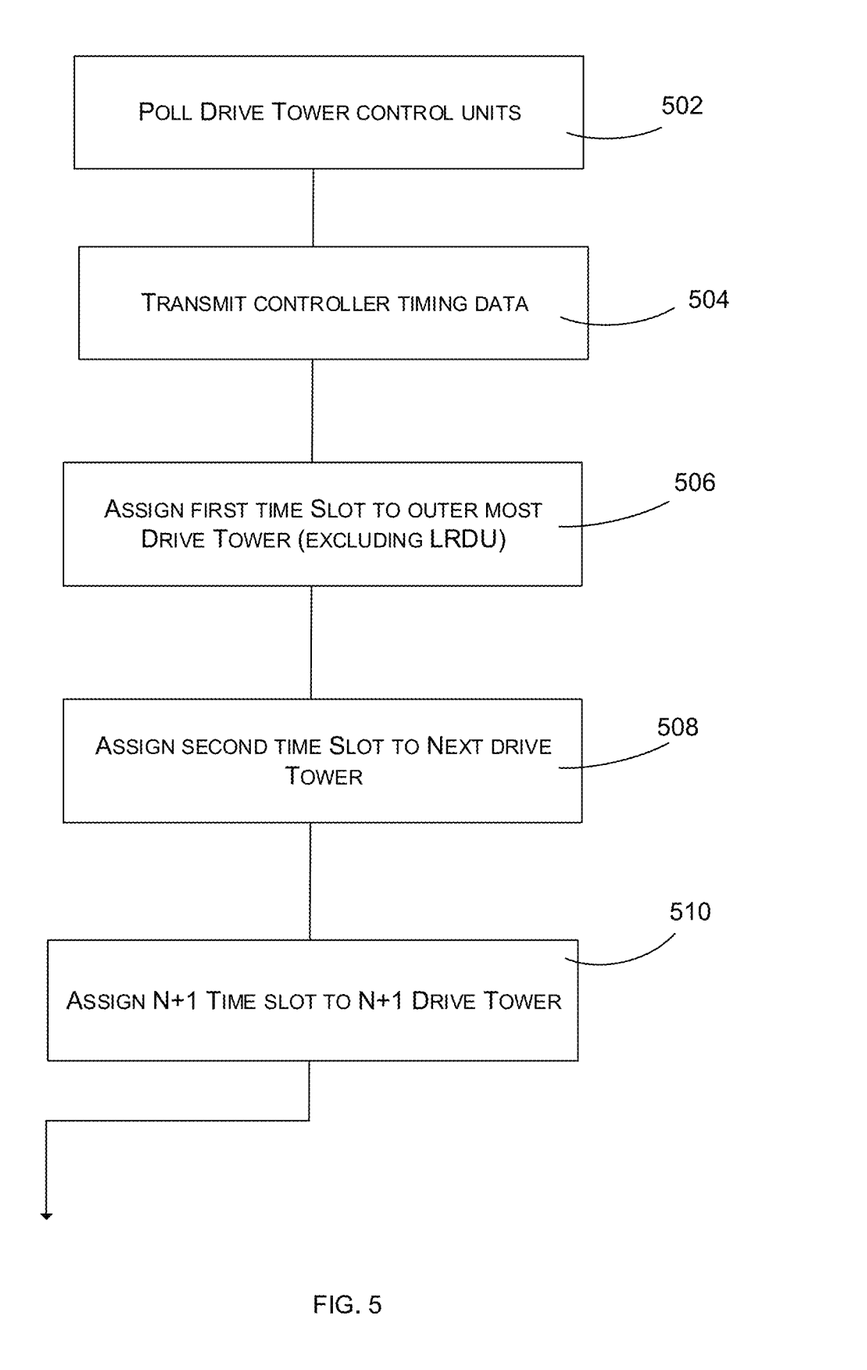
FIG. 5 shows a flow chart illustrating a first alignment method in accordance with a first preferred embodiment of the present invention.
Figure 6:
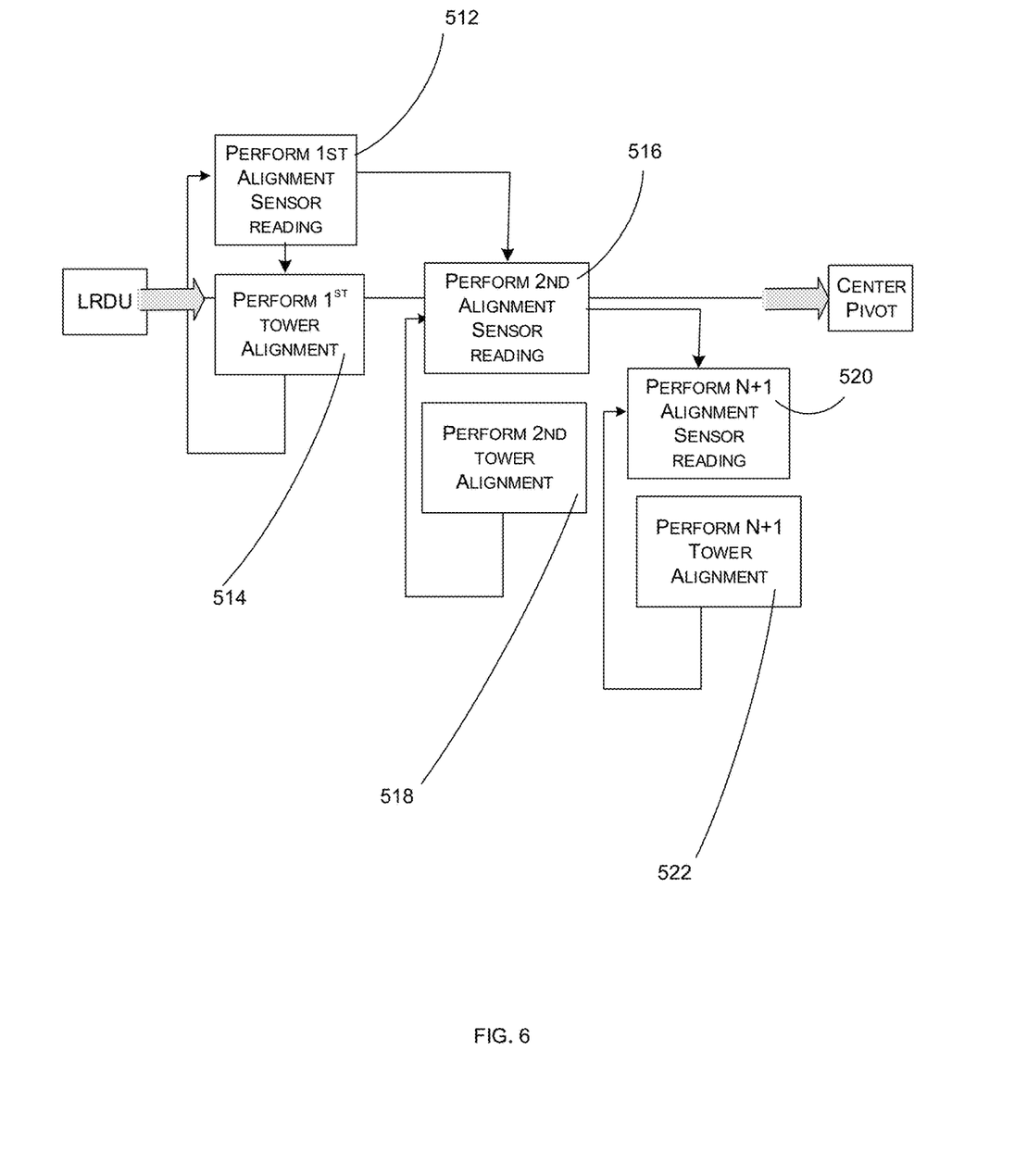
FIG. 6 shows further steps of the first alignment method shown in FIG. 5.

With reference now to FIGS. 5-6, a flow chart illustrating a first alignment method in accordance with a first preferred embodiment of the present invention will now be further discussed. As shown in FIG. 5, at a preferred first step 502, the controller of the base tower/pivot point of the present invention preferably polls each drive tower control unit to determine the presence and status of each drive tower. At a next step 504, the base tower controller preferably transmits controller timing data to each drive tower control unit. In this way, the base tower controller preferably confirms that the timing of each drive tower controller is synced with the base tower timing. At a next step 506, the base tower controller preferably then assigns a first correction time slot to the outer most drive tower control unit (preferably excluding the LRDU). At a next step 508, the base tower controller preferably assigns a second correction time slot to the next upstream drive tower control unit (i.e. the next adjacent drive control unit in the direction of the center pivot). At a next step 510, the base tower controller preferably successively assigns additional times to successive upstream drive tower control units. In this way, beginning at the outer most drive tower (preferably excluding the LRDU), each drive tower is preferably assigned a correction time slot which is a fixed time period later than the previous time slot. According to preferred embodiments, the successive time slots may be incremented anywhere from 0.01-10 seconds. Accordingly, the corrective movements of each drive tower may be staggered so that movement stress may be minimized.

According to alternative preferred embodiments, communications between the pivot controller and between towers may not be required or utilized. Accordingly, each tower controller may be programmed to store time slot information and to independently execute corrective movements without communications with other irrigation machine elements. Still further, each tower controller may also independently execute corrective movements autonomously without any time slot information and without any communications with other irrigation towers.

Referring now to FIG. 6, within each assigned time slot, each tower controller may then preferably independently and successively execute a first step 512, 516, 520 of receiving an alignment sensor reading. Thereafter, each tower controller may then preferably, within each assigned time slot, independently and successively execute a second step 514, 518, 522 of performing an alignment correction based on the received alignment sensor reading. According to a preferred embodiment, the alignment detection/correction algorithms preferably proceed from the outer most drive tower (i.e. nearest the LRDU) to the inner most drive tower (i.e. nearest the center pivot or cart). As discussed with respect to FIG. 4 above, each drive tower controller may preferably direct their respective drive systems to independently speed up or slow down depending on whether the detected alignment is above or below the optimal band. According to a first preferred embodiment, if the detected alignment is within the optimal band, the controlling drive tower will preferably maintain its current speed. According to an alternative preferred embodiment, if the detected alignment is within the optimal band but still above/below the center point, the controlling drive tower may preferably cause the drive to speed up/slow an incremented amount.

According to preferred embodiments of the present invention, the drive tower controllers may preferably speed up or slow down their respective drive towers in a variety of ways. These ways may include: adjusting the duty cycle of a start-stop motor; reducing the revolutions per minute (RPM) of a constant-move (variable speed) motor such as a switch reluctance motor or an induction motor driven by a variable frequency drive; or by other methods. According to an alternative preferred embodiment, the speed of a drive wheel may be controlled by adjusting or changing the programmed average speed of the drive wheel. Accordingly, each drive tower may independently update the programmed average speed of each tower as necessary and may continually cycle between location detection and updating of programmed average speeds of each tower to minimize the misalignment of towers.

According to further preferred embodiments, the alignment algorithm of the present invention may operate when the machine is still or during the operation and running of the irrigation system. Further, the algorithm and system of the present invention may be used to initially align the towers every time the machine is started (i.e., at the beginning of the machine movement) rather than real-time, during the machine movement).

According to an exemplary alternative algorithm, alignments may be calculated and adjusted for within selected groups and sub-groups of towers. In this way, the largest alignment errors within a given sub-group of towers may be identified and locally adjusted for. Preferably, the calculations and adjustments by the drive towers in accordance with the present invention may be continually performed in real time to maintain alignment during irrigation.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be duplex or simplex in nature. Further, the systems of the present invention may be used with any arrangement of drive towers including both linear and center pivot systems. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A method of maintaining the alignment of an irrigation system having a center pivot, a plurality of connected spans and a plurality of drive towers for moving the connected spans, wherein the plurality of drive towers include a first intermediate drive tower, a second intermediate drive tower, and a last regular drive unit (LRDU), wherein the method comprises:
    transmitting controller timing data to the first intermediate drive tower and the second intermediate drive tower;
    assigning a first correction time slot to the second intermediate drive tower;
    assigning a second correction time slot to the first intermediate drive tower, wherein the first correction time slot is before the second correction time slot;
    receiving first alignment data by the first intermediate drive tower;
    receiving second alignment data by the second intermediate drive tower;
    performing a first alignment correction based on the second alignment data received by the second intermediate drive tower; and
    performing a second alignment correction based on the first alignment data received by the first intermediate drive tower;
    wherein the first and second alignment corrections are independently executed by the first and second intermediate drive towers; wherein the first and second alignment corrections are executed by speeding up or slowing down the first and second intermediate drive towers based on whether a detected alignment is above or below an optimal alignment band; and
    wherein the first intermediate drive tower is a first distance from the center pivot; wherein the second intermediate drive tower is a second distance from the center pivot; wherein the first distance is less than the second distance.

2. The method of claim 1, wherein the first and second intermediate drive towers assign the first and second correction time slots; wherein the first and second alignment corrections are performed independent of outside communications.

3. The method of claim 2, wherein the first and second intermediate drive towers are programmed to store time slot information.

4. The method of claim 3, wherein the first and second intermediate drive towers are programmed to independently execute corrective movements.

5. The method of claim 4, wherein the first and second intermediate drive towers are programmed to independently initiate and execute corrective movements autonomously without any time slot information and without communications with other irrigation towers.

6. The method of claim 5, wherein the second intermediate drive tower is configured to independently initiate and execute corrective movements within the first correction time slot.

7. The method of claim 6, wherein the first intermediate drive tower is configured to independently initiate and execute corrective movements within the second correction time slot.

8. The method of claim 7, wherein the first intermediate drive tower is configured to receive updated alignment data between the first correction time slot and the second correction time slot.

9. The method of claim 8, wherein the first intermediate driver tower is configured to perform the second alignment correction based on the second alignment data updated between the first correction time slot and the second correction time slot.

10. The method of claim 9, wherein the first and second alignment corrections proceed from the second intermediate drive tower to the first intermediate drive tower.

11. The method of claim 10, wherein the first intermediate drive tower and the second intermediate drive tower maintain a constant speed if the detected alignment is within the optimal alignment band.

12. The method of claim 11, wherein the first intermediate drive tower maintains a constant speed and the second intermediate drive tower changes its ground speed if the detected alignment is within the optimal alignment band but still above or below a determined center point.

13. The method of claim 12, wherein at least one of the first and second intermediate drive towers changes ground speed by adjusting the duty cycle of a start-stop motor.

14. The method of claim 11, wherein the second intermediate drive tower maintains a constant speed and the first intermediate drive tower changes its ground speed if the detected alignment is within the optimal band but still above or below a determined center point.

15. The method of claim 14, wherein at least one of the first and second intermediate drive towers changes ground speed by reducing the revolutions per minute (RPM) of a variable speed motor.

16. The method of claim 15, wherein the variable speed motor comprises a switch reluctance motor.

17. The method of claim 15, wherein the variable speed motor comprises an induction motor driven by a variable frequency driver.

18. The method of claim 11, wherein at least one of the first and second intermediate drive towers changes ground speeds by changing the programmed average speed of a drive wheel.

19. The method of claim 11, wherein at least one of the first and second intermediate drive towers changes ground speeds by independently updating the programmed average speed of a drive wheel.

20. The method of claim 19, wherein the irrigation system continually cycles between location detection and updating the programmed average speed of the drive wheel.

21. The method of claim 20, wherein the method is initiated while the irrigation system is stationary.

22. The method of claim 21, wherein the irrigation system further includes a third intermediate drive tower and a fourth intermediate drive tower, wherein the method further comprises: designating a first group of drive towers from among the plurality of drive towers; wherein the first group of drive towers comprises at least the first intermediate drive tower and the second intermediate drive tower; and designating a second group of drive towers from among the plurality of drive towers, wherein the second group of drive towers comprises at least the third intermediate drive tower and the fourth intermediate drive tower.

23. The method of claim 22, wherein the method further comprises:
- detecting first alignment errors within the first group of drive towers;
- detecting second alignment errors within the second group of drive towers;
- comparing the first alignment errors and the second alignment errors; and
- correcting the first and second alignment errors within the first and second groups of drive towers; wherein the first and second alignment errors are corrected in order of their magnitude.

* * * * *